(12) United States Patent
Ellul et al.

(10) Patent No.: US 7,696,276 B2
(45) Date of Patent: *Apr. 13, 2010

(54) THERMOPLASTIC ELASTOMERS AND PROCESS FOR MAKING THE SAME

(75) Inventors: Maria D. Ellul, Silver Lake Village, OH (US); Jianya Cheng, Fairlawn, OH (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 15 days.

This patent is subject to a terminal disclaimer.

(21) Appl. No.: 11/259,019

(22) Filed: Oct. 26, 2005

(65) Prior Publication Data

US 2006/0052538 A1 Mar. 9, 2006

(51) Int. Cl.
*C08L 21/00* (2006.01)
*C08L 23/00* (2006.01)

(52) U.S. Cl. .................. 524/500; 524/515; 524/547; 525/191; 525/232; 525/240

(58) Field of Classification Search ............... 524/500, 524/515, 647; 525/191, 232, 240
See application file for complete search history.

(56) References Cited

U.S. PATENT DOCUMENTS

| | | | |
|---|---|---|---|
| 3,929,715 A * | 12/1975 | Nowell et al. ............... 524/570 |
| 4,594,390 A | 6/1986 | Abdou-Sabet et al. |
| 4,994,534 A | 2/1991 | Rhee et al. |
| 5,143,978 A | 9/1992 | Berta |
| 5,196,462 A | 3/1993 | Berta |
| 5,302,454 A | 4/1994 | Cecchin |
| 5,470,900 A | 11/1995 | Sasaki |
| 5,656,693 A | 8/1997 | Ellul et al. |
| 6,147,180 A | 11/2000 | Markel |
| 6,200,509 B1 | 3/2001 | Neubauer et al. |
| 6,214,903 B1 | 4/2001 | Eisinger et al. |
| 6,326,436 B2 | 12/2001 | Bowers |
| 6,342,564 B1 | 1/2002 | Pitkanen et al. |
| 6,433,090 B1 | 8/2002 | Ellul et al. |
| 6,630,538 B1 | 10/2003 | Ellul |

2004/0171758 A1 * 9/2004 Ellul et al. ............... 525/192

FOREIGN PATENT DOCUMENTS

| | | |
|---|---|---|
| CN | 1189514 | 8/1998 |
| EP | 0 775 718 A2 | 5/1997 |
| EP | 1279699 | 1/2003 |
| EP | 1219679 | 2/2005 |
| WO | WO99/64510 | 12/1999 |
| WO | WO01/72894 | 10/2001 |
| WO | WO 03/059963 | 6/2003 |

OTHER PUBLICATIONS

Dr. Gary Williams, Nordel MG—"The Game Changer" . . . For TPV, Sep. 16-17, 2003, Brussels, Belgium.
J.V. Accorsi, The Impact of Carbon Black Morphology and Dispersion on the Weatherability of Polyethylene, Presented at the International Wire & Cable Symposium, Atlantic City, Nov. 18, 1999, pp. 1-8.
M. Rubino, Standard Test Methods for Rubber-Viscosity, Stress Relaxation and Pre-VulcanizationCharacteristics (Mooney Visometer), ASTM D1646-00, Mar. 2006, pp. 1-12.
Nordel MG Hydrocarbon Rubber, Mooney Measurement of NORDEL198 MG, The Dow Chemical Company, Aug. 2005, pp. 1-2.
T. Italiaander, The Gas-Phase Process—A New Era in EPR Polymerization and Processing Technology, May 9-12, 1995, pp. 1-19.
Union Carbon ElastoFlo MEGA-9315, UC-1509, Feb. 1999, pp. 1-4.
"Characteristics of Fine Particles," Chemical Engineering, Jun. 11, 1962, p. 207.
Dow Chemical Company, Technical Information "NORDEL™ MG Hydrocarbon Rubber,NORDEL™ IP and NORDEL™ MG Handling Guide and FDA Status," www.dowplastics.com, pp. 1-7 (Aug. 2005).

* cited by examiner

*Primary Examiner*—Nathan M Nutter

(57) ABSTRACT

A process for producing a thermoplastic elastomer composition, the process comprising synthesizing an elastomeric copolymer by polymerizing ethylene, an α-olefin, and optionally a diene monomer within the gas phase to thereby produce a gas-phase elastomeric copolymer, blending the gas-phase elastomeric copolymer with a thermoplastic polymer to form a mix of the elastomeric copolymer and thermoplastic polymer, and dynamically vulcanizing the gas-phase elastomeric copolymer within the mix of the elastomeric copolymer and thermoplastic polymer.

14 Claims, No Drawings

THERMOPLASTIC ELASTOMERS AND PROCESS FOR MAKING THE SAME

This application claims priority from U.S. Ser. No. 10/481,3775, filed 18 Dec. 2003, which claims priority from PCT/US 02/41908, filed 26 December 2002, which claims priority from U. S. Provisional Application No. 60/349,099, filed on Jan. 15, 2002.

TECHNICAL FIELD

This invention relates to thermoplastic elastomers and processes for making the same. These thermoplastic elastomers are efficiently produced and exhibit unique properties due to the use of a gas-phase polymerized elastomeric copolymer.

BACKGROUND OF THE INVENTION

Thermoplastic elastomers are known. They have many of the properties of thermoset elastomers, yet they are processable as thermoplastics. One type of thermoplastic elastomer is a thermoplastic vulcanizate, which may be characterized by finely-divided rubber particles dispersed within a plastic. These rubber particles are crosslinked to promote elasticity. Thermoplastic vulcanizates are conventionally produced by dynamic vulcanization, which is a process whereby a rubber is cured or vulcanized within a blend with at least one non-vulcanizing polymer while the polymers are undergoing mixing or masticating at some elevated temperature, preferably above the melt temperature of the non-vulcanizing polymer.

Many conventionally produced thermoplastic vulcanizates employ an ethylene-propylene-diene terpolymer (EPDM) as the rubber of choice. These terpolymers have typically been synthesized by using solution polymerization techniques. A shortcoming of solution polymerization is the inability to synthesize high molecular weight polymer (e.g., $M_w$ of 500,000 or more) without oil extending the polymer product. The same shortcomings exist when slurry polymerization techniques are used. Because the use of high molecular weight EPDM rubber is desirable in the manufacture of technologically useful thermoplastic vulcanizates, oil extended EPDM is often used. And, as a result, the oil that is employed to extend the EPDM ultimately becomes part of the thermoplastic vulcanizate. The ability to select an oil during manufacture of the thermoplastic vulcanizate is therefore limited. This can be disadvantageous because it is often desirable to tailor the performance characteristics of the thermoplastic vulcanizate with various oils.

Furthermore, conventional solution-polymerization techniques produce rubber bales, and these bales are then pre-processed by granulating the rubber prior to manufacture of the thermoplastic vulcanizate. This additional manufacturing step can be energy intensive, time consuming, costly, and involves additional process complications.

Conventionally produced thermoplastic vulcanizates also typically include carbon black. Although carbon black is typically added to the composition prior to dynamic vulcanization, conventional wisdom suggests that the carbon black becomes primarily incorporated into the plastic matrix of the thermoplastic vulcanizate. As a result, the advantages associated with carbon black, such as the UV stability, are not believed to be fully realized in the rubber phase.

Because the number of uses of thermoplastic vulcanizates is increasing, the performance demands that are placed on these materials is more demanding, and the manufacturing efficiency of the materials is continually pursued, there exists a need to overcome some of the shortcomings associated with the prior art materials and methods of manufacture.

SUMMARY OF INVENTION

In general the present invention provides a process for producing a thermoplastic elastomer composition, the process comprising synthesizing an elastomeric copolymer by polymerizing ethylene, an α-olefin, and optionally a diene monomer within the gas phase to thereby produce a gas-phase elastomeric copolymer, blending the gas-phase elastomeric copolymer with a thermoplastic polymer to form a mix of the elastomeric copolymer and thermoplastic polymer, and dynamically vulcanizing the gas-phase elastomeric copolymer within the mix of the elastomeric copolymer and thermoplastic polymer.

The present invention further provides a process for producing a thermoplastic elastomer composition, the process comprising providing a granular elastomeric copolymer having dispersed therein carbon black, where the granular elastomeric copolymer is synthesized by using gas-phase polymerization, and dynamically vulcanizing the granular elastomeric copolymer within a blend that includes the elastomeric copolymer and a thermoplastic polymer.

The present invention also includes a thermoplastic elastomer composition comprising a blend of a vulcanized elastomeric copolymer and a thermoplastic polymer, where said vulcanized elastomeric copolymer derives from the vulcanization of an elastomeric copolymer that was synthesized by using gas-phase polymerization techniques, and where the vulcanized elastomeric copolymer and the thermoplastic polymer have carbon black dispersed therein.

The use of gas-phase synthesized elastomeric copolymer, e.g., ethylene-propylene-diene terpolymer, in thermoplastic vulcanizates has unexpectedly solved many problems that were associated with the use of solution-synthesized elastomeric copolymers. To begin with, gas-phase synthesis can provide high molecular weight copolymers that are granular and not oil extended. As a result, technologically useful thermoplastic vulcanizates can be efficiently produced with an oil of choice. Furthermore, the fact that the gas-phase synthesized elastomeric copolymers are granular thereby provides the ability to eliminate certain processing steps during the manufacture of thermoplastic vulcanizates. And, different levels of oil incorporation can be achieved when certain oils are blended with the granular polymer. Further, the synthesis of gas-phase elastomeric copolymers can employ various inert materials, such as carbon black, as dispersants, and as a result, these inert materials are evenly dispersed throughout the polymer. Advantageously, when gas-phased synthesized elastomeric copolymers having carbon black dispersed therein are employed in the manufacture of thermoplastic vulcanizates, the UV stability provided by the carbon black can, in certain embodiments, advantageously exist in both the rubber and plastic phases of the thermoplastic vulcanizate. Also, it has advantageously been found that the carbon black within the rubber can provide thermoplastic vulcanizates having a technologically useful UV stability without the need for adding additional carbon black during the manufacture of the thermoplastic vulcanizate. Still further, the predispersed carbon black is believed to contribute to better extrusion quality of the thermoplastic vulcanizate.

PREFERRED EMBODIMENT FOR CARRYING OUT THE INVENTION

The thermoplastic elastomers of this invention include a blend of an elastomeric copolymer and a non-vulcanizing polymer such as a thermoplastic polymer. The preferred elastomeric copolymer is obtained from the polymerization of ethylene, and α-olefin, and optionally a diene monomer by using gas-phase polymerization techniques. The elastomeric copolymers are advantageously granular and preferably have inert material such as carbon black evenly dispersed therein. These copolymers may be referred to as gas-phase elastomeric copolymers.

Gas-phase elastomeric copolymers include polymeric units deriving from ethylene, an α-olefin, and optionally a diene monomer. These monomers are preferably polymerized by using gas-phase polymerization techniques. These techniques are well known in the art as described in U.S. Pat. Nos. 5,783,645 and 6,011,128, which are incorporated herein by reference.

The α-olefins may include, but are not limited to, propylene, 1-butene, 1-hexene, 4-methyl-1 pentene, 1-octene, 1-decene, or combinations thereof. The preferred α-olefins are propylene, 1-hexene, 1-octene or combinations thereof.

The diene monomers may include, but are not limited to, 5-ethylidene-2-norbornene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; 5-vinyl-2-norbornene, divinyl benzene, and the like, or a combination thereof. The preferred diene monomers are 5-ethylidene-2-norbornene and 5-vinyl-2-norbornene. In the event that the copolymer is prepared from ethylene, α-olefin, and diene monomers, the copolymer may be referred to as a terpolymer or even a tetrapolymer in the event that multiple α-olefins or dienes are used. The preferred elastomeric copolymers include terpolymers of ethylene, propylene, and 5-ethylidene-2-norbornene.

The elastomeric copolymers contain from about 20 to about 90 mole percent ethylene units deriving from ethylene monomer. Preferably, these copolymers contain from about 40 to about 85 mole percent, and even more preferably from about 50 to about 80 mole percent, ethylene units. Furthermore, where the copolymers contain diene units, the diene units can be present in an amount from about 0.1 to about 5 mole percent, preferably from about 0.2 to about 4 mole percent, and even more preferably from about 1 to about 2.5 mole percent. The balance of the copolymer will generally be made up of units deriving from α-olefin monomers. Accordingly, the copolymer may contain from about 10 to about 80 mole percent, preferably from about 15 to about 50 mole percent, and more preferably from about 20 to about 40 mole percent, α-olefin units deriving from α-olefin monomers. The foregoing mole percentages are based upon the total moles of the polymer.

Elastomeric copolymers employed in this invention can be synthesized in a gas-phase fluidized bed reactor, as disclosed in U.S. Pat. Nos. 4,379,558, 4,383,095, 4,521,566, 4,876,320, 4,994,534, 5,317,036, 5,453,471, 5,648,442, 6,228,956, and 6,028,140, which are incorporated herein by reference. They can likewise be synthesized in a gas-phase stirred reactor as disclosed in U.S. Pat. No. 3,256,263, which is incorporated herein by reference. These gas-phase polymerization processes can be conducted in the condensed mode, induced condensed mode, or liquid monomer mode, all of which are known in the art.

The catalyst employed to polymerize the ethylene, α-olefin, and diene monomers into elastomeric copolymers can include both traditional Ziegler-Natta type catalyst systems, especially those including vanadium compounds, as disclosed in U.S. Pat. No. 5,783,64, as well as metallocene catalysts, which are also disclosed in U.S. Pat. No. 5,793,645. Other catalysts systems such as the Brookhardt catalyst system may also be employed.

Preferably, the elastomeric copolymers are produced in the presence of an inert particulate matter such as carbon black, silica, clay, talc, or the like, as described in U.S. Pat. No. 4,994,534, which is incorporated herein by reference. The preferred inert particulate material is carbon black.

The gas-phase elastomeric copolymers preferably have a weight average molecular weight ($M_w$) that is greater than about 200,000, more preferably from about 300,000 to about 1,000,000, even more preferably from about 400,000 to about 900,000, and still more preferably from about 500,000 to about 700,000. These copolymers preferably have a number average molecular weight ($M_n$) that is greater than about 80,000, more preferably from about 100,000 to about 350,000, even more preferably from about 120,000 to about 300,000, and still more preferably from about 130,000 to about 250,000. Advantageously, the use of gas-phase elastomeric copolymers allows high molecular weight copolymer, as described above, to be employed without oil extension.

Useful gas-phase elastomeric copolymers preferably have a Mooney Viscosity (ML(1+4@125° C.)) of from about 80 to about 450, more preferably from about 200 to about 400, and even more preferably from about 300 to about 380, where the Mooney Viscosity is that of the neat polymer.

The gas-phase elastomeric copolymers are advantageously granular. Preferably, the particle size of the granules is from about 0.4 to about 1.0 mm, more preferably from about 0.5 to about 0.9 mm, and even more preferably from about 0.6 to about 0.8 mm.

Because an inert particulate material is employed during the gas-phase synthesis of the elastomeric copolymers, the resulting elastomeric copolymer granules will contain dispersed therein or coated thereon the inert particulate material. In a preferred embodiment, where carbon black is employed as the inert particulate material, the resulting elastomeric copolymer granules will include from about 10 to about 40 parts by weight carbon black per 100 parts by weight rubber, more preferably from about 12 to about 30 parts by weight carbon black per 100 parts by weight rubber, and more preferably from about 15 to about 25 parts by weight carbon black per 100 parts by weight rubber.

The thermoplastic elastomers of this invention may also include conventional elastomeric copolymers. These copolymers are typically solution or slurry polymerized. Examples of these elastomeric copolymers include rubbery copolymers polymerized from ethylene, at least one alphaolefin monomer, and at least one diene monomer, as well as butyl rubber, which refers to a rubbery amorphous copolymer of isobutylene and isoprene or an amorphous terpolymer of isobutylene, isoprene, and a divinyl aromatic monomer. The conventional elastomeric copolymers are normally not in granular form and do not have dispersed therein an inert material as a direct result of the manufacturing or synthesis of the polymer. These copolymer are well known in the art as disclosed in U.S. Pat. Nos. 4,130,535 and 6,451,915, which are incorporated herein by reference.

The thermoplastic polymer is a solid, generally high molecular weight plastic material, which may be referred to as a thermoplastic resin. Preferably, this resin is a crystalline or a semi-crystalline polymer, and more preferably is a resin that has a crystallinity of at least 25 percent as measured by differential scanning calorimetry. Polymers with a high glass transition temperature are also acceptable as the thermoplastic resin. The melt temperature of these resins should generally be lower than the decomposition temperature of the rubber. Reference to a thermoplastic resin will include a thermoplastic resin or a mixture of two or more thermoplastic resins.

The thermoplastic resins preferably have a weight average molecular weight ($M_w$) from about 200,000 to about 700,000, and a number average molecular weight ($M_n$) from about 80,000 to about 200,000. More preferably, these resins have a $M_w$ from about 300,000 to about 600,000, and a $M_n$ from about 90,000 to about 150,000.

The thermoplastic resins generally have a melt temperature ($T_m$) that is from about 150 to about 175° C., preferably from about 155 to about 170° C., and even more preferably from about 160 to about 170° C. The glass transition temperature ($T_g$) of these resins is from about −5 to about 10° C., preferably from about −3 to about 5° C., and even more preferably from about 0 to about 2° C. The crystallization temperature ($T_c$) of these resins is from about 95 to about 130° C., preferably from about 100 to about 120° C., and even more preferably from about 105 to about 115° C. as measured by DSC and cooled at 10° C./min.

The thermoplastic resins generally have a melt flow rate that is less than about 10 dg/min, preferably less than about 2 dg/min, and still more preferably less than about 0.8 dg/min. Melt flow rate is a measure of how easily a polymer flows under standard pressure, and is measured by using ASTM D-1238 at 230° C. and 2.16 kg load.

Exemplary thermoplastic resins include crystallizable polyolefins, polyimides, polyesters (nylons), poly(phenylene ether), polycarbonates, styrene-acrylonitrile copolymers, polyethylene terephthalate, polybutylene terephthalate, polystyrene, polystyrene derivatives, polyphenylene oxide, polyoxymethylene, and fluorine-containing thermoplastics the preferred thermoplastic resins are crystallizable polyolefins that are formed by polymerizing α-olefins such as ethylene, propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene or ethylene or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof is also contemplated. These homopolymers and copolymers may be synthesized by using any polymerization technique known in the art such as, but not limited to, the "Phillips catalyzed reactions," conventional Ziegler-Natta type polymerizations, and metallocene catalysis including, but not limited to, metallocene-alumoxane and metallocene-ionic activator catalysis.

An especially preferred thermoplastic resin is high-crystalline isotactic or syndiotactic polypropylene. This polypropylene generally has a density of from about 0.85 to about 0.91 g/cc, with the largely isotactic polypropylene having a density of from about 0.90 to about 0.91 g/cc. Also, high and ultra-high molecular weight polypropylene that has a fractional melt flow rate is highly preferred. These polypropylene resins are characterized by a melt flow rate that is less than or equal to 10 dg/min and more preferably less than or equal to 1.0 dg/min per ASTM D-1238.

Any curative that is capable of curing or crosslinking the elastomeric copolymer may be used. Some non-limiting examples of these curatives include phenolic resins, peroxides, maleimides, and silicon-containing curatives.

Any phenolic resin that is capable of crosslinking a rubber polymer can be employed in practicing the present invention. U.S. Pat. Nos. 2,972,600 and 3,287,440 are incorporated herein in this regard. The preferred phenolic resin curatives can be referred to as resole resins and are made by condensation of alkyl substituted phenols or unsubstituted phenols with aldehydes, preferably formaldehydes, in an alkaline medium or by condensation of bi-functional phenoldialcohols. The alkyl substituents of the alkyl substituted phenols typically contain 1 to about 10 carbon atoms. Dimethylol phenols or phenolic resins, substituted in para-positions with alkyl groups containing 1 to about 10 carbon atoms are preferred. These phenolic curatives are typically thermosetting resins and may be referred to as phenolic resin curatives or phenolic resins. These phenolic resins are ideally used in conjunction with a catalyst system. For example, non-halogenated phenol curing resins are preferably used in conjunction with halogen donors and, optionally, a hydrogen halide scavenger. Where the phenolic curing resin is halogenated, a halogen donor is not required but the use of a hydrogen halide scavenger, such as ZnO, is preferred. For a further discussion of phenolic resin curing of thermoplastic vulcanizates, reference can be made to U.S. Pat. No. 4,311,628, which is incorporated herein by reference.

An example of a preferred phenolic resin curative is defined according to the general formula (I).

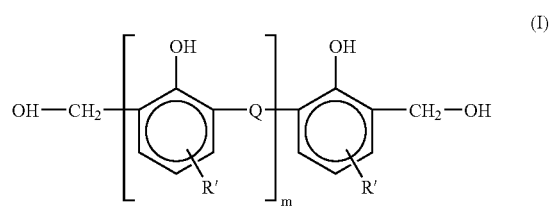

where Q is a divalent radical selected from the group consisting of —CH$_2$—, —CH$_2$—O—CH$_2$—; m is zero or a positive integer from 1 to 20 and R' is an organic radical. Preferably, Q is the divalent radical —CH$_2$—O—CH$_2$—, m is zero or a positive integer from 1 to 1.0, and R' is an organic radical having less than 90 carbon atoms. Still more preferably m is zero or a positive integer from 1 to 5 and R' is an organic radical having between 4 and 12 carbon atoms.

Peroxide curatives are generally selected from organic peroxides. Examples of organic peroxides include, but are not limited to, di-tert-butyl peroxide, dicumyl peroxide, t-butylcumyl peroxide, α,α-bis(tert-butrylperoxy) diisopropyl benzene, 2,5 dimethyl 2,5-di(t-butylperoxy)hexane, 1,1-di(t-butylperoxy)-3,3,5-trimethyl cyclohexane, benzoyl peroxide, lauroyl peroxide, dilauroyl peroxide, 2,5-dimethyl-2,5-di(tert-butylperoxy) hexene-3, and mixtures thereof. Also, diaryl peroxides, ketone peroxides, peroxydicarbonates, peroxyesters, dialkyl peroxides, hydroperoxides, peroxyketals and mixtures thereof may be used. Coagents such as triallylcyanurate are typically employed in combination with these peroxides. For a further discussion of peroxide curatives and their use for preparing thermoplastic vulcanizates, reference can be made to U.S. Pat. No. 5,656,693, which is incorporated herein by reference. When peroxide curatives are employed, the elastomeric copolymer will preferably include 5-vinyl-2-norbornene and 5-ethylidene-2-norbornene as the diene component.

Useful silicon-containing curatives generally include silicon hydride compounds having at least two SiH groups. These compounds react with carbon-carbon double bonds of unsaturated polymers in the presence of a hydrosilation catalyst. Silicon hydride compounds that are useful in practicing the present invention include, but are not limited to, methylhydrogen polysiloxanes, methylhydrogen dimethyl-siloxane copolymers, alkyl methyl polysiloxanes, bis(dimethylsilyl)alkanes, bis(dimethylsilyl)benzene, and mixtures thereof.

Preferred silicon hydride compounds may be defined by the formula

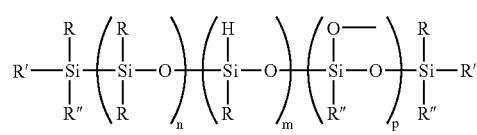

where each R is independently selected from alkyls containing 1 to 20 carbon atoms, cycloalkyls containing 4 to 12 carbon atoms, and aryls, m is an integer having a value ranging from 1 to about 50, n is an integer having a value ranging from 1 to about 50, and p is an integer having a value ranging from 0 to about 6.

As noted above, hydrosilation curing of the elastomeric polymer is preferably conducted in the presence of a catalyst. These catalysts can include, but are not limited to, peroxide catalysts and catalysis including transition metals of Group VIII. These metals include, but are not limited to, palladium, rhodium, and platinum, as well as complexes of these metals. For a further discussion of the use of hydrosilation to cure thermoplastic vulcanizates, reference can be made to U.S. Pat. Nos. 5,936,028, 6,251,998, and 6,150,464, which is incorporated herein by reference. When silicon-containing curatives are employed, the elastomeric copolymer employed will preferably include 5-vinyl-2-norbornene as the diene component.

Another useful cure system is disclosed in U.S. Pat. No. 6,277,916 B1, which is incorporated herein by reference. These cure systems employ polyfunctional compounds such as poly(sulfonyl azide)s.

Plasticizers, extender oils, synthetic processing oils, or a combination thereof may be employed in the compositions of the present invention. The extender oils may include, but are not limited to, aromatic, naphthenic, and paraffinic extender oils. Exemplary synthetic processing oils are polylinear α-olefins, polybranched α-olefins, and hydrogenated polyalphaolefins. The compositions of this invention may include organic esters, alkyl ethers, or combinations thereof. U.S. Pat. No. 5,290,886 and 5,397,832 are incorporated herein in this regard. The addition of certain low to medium molecular weight organic esters and alkyl ether esters to the compositions of the invention dramatically lowers the $T_g$ of the polyolefin and rubber components, and of the overall composition, and improves the low temperatures properties, particularly flexibility and strength. These organic esters and alkyl ether esters generally have a molecular weight that is generally less than about 10,000. It is believed that the improved effects are achieved by the partitioning of the ester into both the polyolefin and rubber components of the compositions. Particularly suitable esters include monomeric and oligomeric materials having an average molecular weight below about 2000, and preferably below about 600. The ester should be compatible, or miscible, with both the polyolefin and rubber components of the composition; i.e. that it mix with the other components to form a single phase. The esters found to be most suitable were either aliphatic mono- or diesters or alternatively oligomeric aliphatic esters or alkyl ether esters. Polymeric aliphatic esters and aromatic esters were found to be significantly less effective, and phosphate esters were for the most part ineffective.

In certain embodiments of this invention, the thermoplastic vulcanizate may likewise include a polymeric processing additive. The processing additive employed is a polymeric resin that has a very high melt flow index. These polymeric resins include both linear and branched molecules that have a melt flow rate that is greater than about 500 dg/min, more preferably greater than about 750 dg/min, even more preferably greater than about 1000 dg/min, still more preferably greater than about 1200 dg/min, and still more preferably greater than about 1500 dg/min. Melt flow rate is a measure of how easily a polymer flows under standard pressure, and is measured by using ASTM D-1238 at 230° C. and 2.16 kg load. The thermoplastic elastomers of the present invention may include mixtures of various branched or various linear polymeric processing additives, as well as mixtures of both linear and branched polymeric processing additives. Reference to polymeric processing additives will include both linear and branched additives unless otherwise specified. The preferred linear polymeric processing additives are polypropylene homopolymers. The preferred branched polymeric processing additives include diene-modified polypropylene polymers. Thermoplastic vulcanizates that include similar processing additives are disclosed in U.S. Pat. No. 6,451,915, which is incorporated herein by reference.

In addition to the thermoplastic resin, the thermoplastic elastomer, curatives and optional extender oils, the composition may also include reinforcing and non-reinforcing fillers, antioxidants, stabilizers, rubber processing oil, lubricants, antiblocking agents, anti-static agents, waxes, foaming agents, pigments, flame retardants and other processing aids known in the rubber compounding art. These additives can comprise up to about 50 weight percent of the total composition. Fillers and extenders that can be utilized include conventional inorganics such as calcium carbonate, clays, silica, talc, titanium dioxide, carbon black, as well as organic and inorganic nanoscopic fillers. Fillers, such as carbon black, are preferably added in combination with a carrier such as polypropylene. This invention advantageously provides the ability to add filler, such as carbon black, together with the rubber as well as together with a thermoplastic carrier such as polypropylene in a single-pass or one-step process.

Preferably, compositions of this invention will contain a sufficient amount of the elastomeric copolymer to form rubbery compositions of matter. The skilled artisan will understand that rubbery compositions of matter are those that have ultimate elongations greater than 100 percent, and that quickly retract to 150 percent or less of their original length within about 10 minutes after being stretched to 200 percent of their original length and held at 200 percent of their original length for about 10 minutes.

Accordingly, the thermoplastic elastomers of the present invention should comprise at least about 25 percent by weight elastomeric copolymer, preferably at least about 35 percent by weight elastomeric copolymer, even more preferably at least about 45 percent by weight elastomeric copolymer, and still more preferably at least about 50 percent by weight elastomeric copolymer. More specifically, the amount of elastomeric copolymer within the thermoplastic vulcanizate is generally from about 25 to about 90 percent by weight, preferably from about 45 to about 85 percent by weight, and more preferably from about 60 to about 80 percent by, weight, based on the entire weight of the thermoplastic vulcanizate.

In one embodiment, the elastomeric copolymer component of the thermoplastic elastomers will consist entirely of the gas-phase elastomeric copolymers. In other embodiments, the elastomeric copolymer component will include both gas-phase elastomeric copolymers as well as conventional elastomeric copolymers (e.g., solution-polymerized elastomeric copolymer or slurry-polymerized elastomeric copolymer). In these latter embodiments, the elastomeric copolymer component may include from about 1.0 to about 90 parts by weight of the gas-phase elastomeric copolymer and from about 90 to about 10 parts by weight of a conventional elastomeric copolymer, preferably from about 20 to about 80 parts by weight gas-phase elastomeric copolymer and from about 80 to about 20 parts by weight conventional elastomeric copolymer, more preferably from about 30 to about 70 parts by weight gas-phase elastomeric copolymer and from about 70 to about 30 parts by weight conventional elastomeric copolymer, even more preferably from about 40 to about 60 parts by weight gas-phase elastomeric copolymer and from about 60 to about 40 parts by weight conventional elastomeric copolymer, and still more preferably about 50 parts by weight gas-phase elastomeric copolymer and about 50 parts by weight conventional elastomeric copolymer, based on the entire weight of the elastomeric copolymer (or rubber component).

The thermoplastic elastomers should generally comprise from about 10 to about 80 percent by weight of the thermoplastic resin based on the total weight of the rubber and thermoplastic resin combined. Preferably, the thermoplastic elastomers comprise from about 15 to about 80 percent by weight, more preferably from about 20 to about 40 percent by weight, and even more preferably from about 25 to about 35 percent by weight of the thermoplastic resin based on the total weight of the rubber and thermoplastic resin combined.

Where a phenolic resin curative is employed, a vulcanizing amount curative preferably comprises from about 1 to about 20 parts by weight, more preferably from about 3 to about 16 parts by weight, and even more preferably from about 4 to about 12 parts by weight, phenolic resin per 100 parts by weight rubber.

The skilled artisan will be able to readily determine a sufficient or effective amount of vulcanizing agent to be employed without undue calculation or experimentation. The amount of vulcanizing agent should be sufficient to at least partially vulcanize the elastomeric polymer. Preferably, the elastomeric polymer is completely vulcanized.

Where a peroxide curative is employed, a vulcanizing amount of curative preferably comprises from about $1 \times 10^{-4}$ moles to about $4 \times 10^{-2}$ moles, more preferably from about $2 \times 10^{-4}$ moles to about $3 \times 10^{-2}$ moles, and even more preferably from about $7 \times 10^{-4}$ moles to about $2 \times 10^{-2}$ moles per 100 parts by weight rubber.

Where silicon-containing curative is employed, a vulcanizing amount of curative preferably comprises from 0.1 to about 10 mole equivalents, and preferably from about 0.5 to about 5 mole equivalents, of SiH per carbon-carbon double bond.

Generally, from about 5 to about 300 parts by weight, preferably from about 30 to about 250 parts by weight, and more preferably from about 70 to about 200 parts by weight, of extender oil per 100 parts rubber is added. The quantity of extender oil added depends upon the properties desired, with the upper limit depending upon the compatibility of the particular oil and blend ingredients; this limit is exceeded when excessive exuding of extender oil occurs. The amount of ester plasticizer in the composition will generally be less than about 250 parts, and preferably less than about 175 parts, per 100 parts rubber.

When employed, the thermoplastic elastomers should generally comprise from about 1 to about 25 percent by weight of the polymeric processing additive based on the total weight of the rubber and thermoplastic resin combined. Preferably, the thermoplastic elastomers comprise from about 1.5 to about 20 percent by weight, and more preferable from about 2 to about 15 percent by weight of the polymeric processing additive based on the total weight of the rubber and thermoplastic resin combined.

Fillers, such as carbon black or clay, may be added in amount from about 10 to about 250, per 100 parts by weight of rubber. The amount of carbon black that can be used depends, at least in part, upon the type of carbon black and the amount of extender oil that is used. The amount of extender oil depends, at least in part, upon the type of rubber. High viscosity rubbers are more highly oil extendable.

Preferably, the rubber is crosslinked by dynamic vulcanization. The term dynamic vulcanization refers to a vulcanization or curing process for a rubber contained in a thermoplastic elastomer composition, wherein the rubber is vulcanized under conditions of high shear at a temperature above the melting point of the polyolefin component. The rubber is thus simultaneously crosslinked and dispersed as fine particles within the polyolefin matrix, although other morphologies may also exist. Dynamic vulcanization is effected by mixing the thermoplastic elastomer components at elevated temperature in conventional mixing equipment such as roll mills, Banbury mixers, Brabender mixers, continuous mixers, mixing extruders and the like. One method for preparing thermoplastic vulcanizates is described in U.S. Pat. No. 4,594,390, which is incorporated herein by reference, although methods employing low shear rates can also be used.

Those ordinarily skilled in the art will appreciate the appropriate quantities, types of cure systems, and vulcanization conditions required to carry out the vulcanization of the rubber. The rubber can be vulcanized by using varying amounts of curative, varying temperatures, and a varying time of cure in order to obtain the optimum crosslinking desired. Because the conventional elastomeric copolymers are not granular and do not include inert material as part of the manufacturing or synthesis of the polymer, additional process steps must be included to granulate or add inert material, if desired, to the conventional elastomeric copolymer. On the other hand, gas-phase elastomeric copolymers are granular and include particulate material, such as carbon black, and therefore the manufacture of thermoplastic vulcanizates from these elastomeric copolymers does not require, i.e., can be devoid of an elastomeric copolymer granulation step or a step of pre-dispersing inert material, such as carbon black, into the elastomeric copolymer.

Despite the fact that the rubber component is partially or fully cured, the compositions of this invention can be processed and reprocessed by conventional plastic processing techniques such as extrusion, injection molding, and compression molding. The rubber within these thermoplastic elastomers is usually in the form of finely-divided and well-dispersed particles of vulcanized or cured rubber, although a co-continuous morphology or a phase inversion is also possible.

The thermoplastic elastomer of this invention are useful for making a variety of articles such as weather seals, hoses, belts, gaskets, moldings, boots, elastic fibers and like articles. They are particularly useful for making articles by blow molding, extrusion, injection molding, thermo-forming, elasto-welding and compression molding techniques. More specifically, they are useful for making vehicle parts such as weather seals, brake parts such as cups, coupling disks, and diaphragm cups, boots such as constant velocity joints and rack and pinion joints, tubing, sealing gaskets, parts of hydraulically or pneumatically operated apparatus, o-rings, pistons, valves, valve seats, valve guides, and other elastomeric polymer based parts or elastomeric polymers combined with other materials such as metal/plastic combination materials. Also contemplated are transmission belts including V-belts, toothed belts with truncated ribs containing fabric faced V's, ground short fiber reinforced V's or molded gum with short fiber flocked V's.

In order to demonstrate the practice of the present invention, the following examples have been prepared and tested. The examples should not, however, be viewed as limiting the scope of the invention. The claims will serve to define the invention.

GENERAL EXPERIMENTATION

Samples 1-8

Thermoplastic vulcanizates were prepared by employing either solution-synthesized EPDM or gas-phase polymerized EPDM. Table I provides the characteristics of the various EPDMs.

TABLE I

|  | EPDM I | EPDM II | EPDM III | EPDM IV |
|---|---|---|---|---|
| Synthesis Method | solution | solution | gas-phase | gas-phase |
| Catalyst | vanadium-based | vanadium-based | metallocene | vanadium |
| Mooney (ML$_{1+4}$@125° C.) | 50 | 91 | 80 | 84 |
| Ethylene Weight % | 64 | 55.5 | 68 | 64.2 |
| Propylene Weight % | 32.1 | 38.8 | 28 | 32.3 |
| 5-ethylidene-2-norbornene Weight % | 3.9 | 5.7 | 4.0 | 3.5 |
| Molecular Weight (GPC) | — | — | — | — |
| M$_n$ | 150,000 | 81,900 | — | — |
| M$_w$ | 450,000 | 288,000 | — | — |
| Oil (parts/100 parts rubber) | 75 | 0 | 0 | 0 |
| Carbon Black (parts/100 parts rubber) | 0 | 0 | 18-30 | 18-30 |

The thermoplastic vulcanizates were prepared by using large-scale high shear mixers and the method as set forth in U.S. Pat. No. 4,594,390. The ingredients used in each thermoplastic vulcanizate are disclosed in Table II together with physical testing that was performed on Samples that were molded at 190° C. In addition to the ingredients set forth in Table II, each thermoplastic vulcanizate included 42.78 parts by weight clay per 100 parts by weight rubber, 3.4 parts by weight wax per 100 parts by weight rubber, 1.94 parts by weight zinc oxide per 100 parts by weight rubber, 1.26 parts by weight stannous chloride per 100 parts by weight rubber, and 4.4 parts by weight phenolic resin per 100 parts by weight rubber.

The clay employed was obtained under the tradename ICE-CAP K (Burgess), the carbon black was obtained under the tradename AMPACET 49974 (which contains about 40% by weight carbon black and about 60% by weight polypropylene as a carrier), the processing oil was obtained under the tradename SUNPAR 150M, the wax was obtained under the tradename OKERIN™ wax, and the phenolic resin was obtained under the tradename SP1045 (Schenectady Int., Schenectady, N.Y.). Polypropylene I was obtained under the tradename D008M (Aristech), which has an MFR of about 0.8 dg/min, Polypropylene II was obtained under the tradename FP230 (Aristech), which has an MFR of about 30 dg/min, Polypropylene III was obtained under the tradename 3746G (Exxon), which has an MFR of about 1,200 dg/min, Polypropylene IV was obtained under the tradename 51S07A (Equistar), which has an MFR of about 0.7 dg/min, and Polypropylene V was obtained under the tradename TR 477 (Equistar), which has an MFR of about 0.5 dg/min.

Samples 9-18

In a similar fashion to Samples 1-8, additional thermoplastic vulcanizates were prepared by using both solution-polymerized or synthesized and gas-phase synthesized EPDM. Distinguishing ingredients and the results of the physical resting of each thermoplastic vulcanizate is set forth in Table III.

TABLE II

|  | 1 | 2 | 3 | 4 | 5 | 6 | 7 | 8 |
|---|---|---|---|---|---|---|---|---|
| EPDM I | 175 | 175 | 175 | — | — | — | — | — |
| EPDM II | — | — | — | — | — | — | — | 100 |
| EPDM III | — | — | — | 118 | 118 | 118 | 118 | — |
| Polypropylene I | 36.9 | — | — | 36.6 | 36.6 | 30.6 | — | 36.6 |
| Polypropylene II | — | — | — | 6.7 | 6.7 | 6.7 | 6.7 | — |
| Polypropylene III | — | — | — | — | — | 6 | 6 | — |
| Polypropylene IV | — | 36.9 | — | — | — | — | — | — |
| Polypropylene V | — | — | 36.9 | — | — | — | 30.6 | — |
| Carbon Black (40% active) | 24.4 | 24.4 | 24.4 | — | — | — | — | — |
| Processing Oil | 59.9 | 59.9 | 59.9 | 134.9 | 134.9 | 134.9 | 134.9 | 134.9 |
| Moisture (%) | 0.043 | 0.06 | 0.045 | 0.071 | 0.034 | 0.036 | 0.066 | 0.037 |
| Hardness (Shore A) | 69.4 | 67.8 | 67.3 | 62.5 | 61.7 | 62.1 | 62.2 | 65.1 |
| Specific Gravity | 0.99 | 0.958 | 1.009 | 0.998 | 0.986 | 0.998 | 0.998 | 0.961 |
| Ultimate Tensile Strength (MPa) | 7.05 | 6.61 | 6.91 | 5.26 | 5.34 | 4.80 | 5.12 | 5.10 |
| Ultimate Elongation (%) | 450 | 448 | 424 | 341 | 357 | 335 | 343 | 299 |
| M 100 (MPa) | 2.63 | 2.36 | 2.78 | 2.16 | 2.01 | 1.99 | 1.99 | 2.32 |
| Weight Gain (%) | 79 | 84 | 87 | 87 | 88 | 88 | 83 | 82 |
| LCR (Pa · s @ 1200 s$^{-1}$ @ 204° C.) | 85.1 | 89.7 | 92.2 | 86.6 | 83.9 | 82.7 | 88.9 | 85.2 |
| ESR | 70 | 90 | 70 | 88 | 89 | 106 | 89 | 122 |
| Tension Set (%) | 10 | 8 | 10 | 9.5 | 9.5 | 9.5 | 9.5 | 15 |
| Spot Count | 84 | >100 | >100 | 51 | 10 | 12 | 6 | >100 |
| UV @ 2,500 kJ (ΔE) | 0.93 | 0.96 | — | 1.12 | 1.08 | 1.03 | — | — |

TABLE III

|  | 9 | 10 | 11 | 12 | 13 |
|---|---|---|---|---|---|
| EPDM I | — | — | — | — | 175 |
| EPDM II | 100 | 100 | 100 | 100 | 100 |
| EPDM IV | — | — | — | — | — |
| Polypropylene IV | 219.1 | 219.1 | 57 | 57 | 57 |
| Carbon Black | 19.28 | 19.28 | 8.65 | 8.65 | 8.65 |
| Phenolic Resin | 6 | 6 | 5.5 | 5.5 | 5.5 |
| Processing Oil | 130 | 110 | 130 | 110 | 55 |
| Moisture (%) | 0.013 | 0.019 | 0.02 | 0.018 | 0.015 |
| Hardness, Shore A (D) | (37) | (40) | 73 | 75 | 76.8 |
| Specific Gravity | 0.955 | 0.963 | 0.97 | 0.968 | 0.891 |
| Ultimate Tensile Strength (MPa) | 12.51 | 13.56 | 6.94 | 7.29 | 7.95 |
| Ultimate Elongation (%) | 637 | 637 | 299 | 320 | 436 |
| M 100 (MPa) | 7.64 | 8.38 | 3.05 | 3.26 | 3.19 |
| Weight Gain (%) | 67.5 | 69 | 73.5 | 88.5 | 72.5 |
| ACR (Poise) | 1465 | 2188 | 1873 | 188 | 659 |
| ESR | 78 | 36 | 209 | 68 | 64 |
| Tension Set (%) | 49.5 | 49 | 10.5 | 11.5 | 13 |

|  | 14 | 15 | 16 | 17 | 18 |
|---|---|---|---|---|---|
| EPDM I | 175 | — | — | — | — |
| EPDM II | — | — | — | — | — |
| EPDM IV | — | 118 | 118 | 118 | 118 |
| Polypropylene IV | 219.1 | 57 | 57 | 219.1 | 219.1 |
| Carbon Black | 19.28 | — | — | — | — |
| Phenolic Resin | 6 | 5.5 | 5.5 | 6 | 6 |
| Processing Oil | 55 | 130 | 110 | 130 | 110 |
| Moisture (%) | 0.044 | 0.025 | 0.028 | 0.017 | 0.029 |
| Hardness Shore A (D) | (41.1) | 73.1 | 77.1 | 40.7 | 43.6 |
| Specific Gravity | 0.952 | 0.99 | 1.0 | 0.966 | 0.969 |
| Ultimate Tensile Strength (MPa) | 16.22 | 4.73 | 5.29 | 10.74 | 12.38 |
| Ultimate Elongation (%) | 590 | 354 | 306 | 459 | 527 |
| M 100 (MPa) | 8.35 | 2.77 | 3.17 | 8.16 | 8.73 |
| Weight Gain (%) | 44.5 | 93 | 102.5 | 49 | 50.5 |
| ACR (Poise) | 860 | 205 | 606 | 597 | 989 |
| ESR | 35 | 407 | 388 | 179 | 247 |
| Tension Set (%) | 42 | 19.5 | 20.5 | 55 | 55 |

Samples 19-20

In a similar fashion to Samples 1-18, a thermoplastic vulcanizate was prepared by using solution-polymerized EPDM and comparing this thermoplastic vulcanizate to a thermoplastic vulcanizate prepared by using a blend of solution-polymerized EPDM and gas-phase synthesized EPDM. Distinguishing ingredients and results of the analytical testing of the thermoplastic vulcanizates is set forth in Table IV.

TABLE IV

|  | 19 | 20 |
|---|---|---|
| EPDM I | 175 | 87.5 |
| EPDM III | — | 59 |
| Polypropylene I | 36.9 | 36.9 |
| Polypropylene II | — | 14.4 |
| Carbon Black | 24.4 | 0 |
| Processing Oil | 59.9 | 97.4 |
| Moisture (%) | 0.028 | 0.038 |
| Hardness (Shore A) | 70.1 | 68 |
| Specific Gravity | 0.991 | 0.964 |
| Ultimate Tensile Strength (MPa) | 7.39 | 6.47 |
| Ultimate Elongation (%) | 441 | 380 |
| M 100 (MPa) | 2.68 | 2.66 |
| Weight Gain (%) | 79 | 78.5 |
| LCR (Pa · s @ 1200 s$^{-1}$ @ 204° C.) | 92.7 | 82.4 |
| ESR | 77 | 75 |
| Tension Set (%) | 11.5 | 10.5 |
| UV @ 2,500 kJ (ΔE) | 0.86 | 0.80 |

Samples 30-34

Four additional thermoplastic vulcanizates were prepared in a similar fashion to the previous samples except that the thermoplastic vulcanizates were dynamically cured by employing a peroxide cure system at lower rates. In addition to the ingredients set forth in Table V, each thermoplastic vulcanizate included 42 parts by weight clay per 100 parts by weight rubber.

TABLE V

|  | Samples | | | |
|---|---|---|---|---|
|  | 21 | 22 | 23 | 24 |
| EPDM I | 175 | — | — | — |
| EPDM III | — | 120 | 120 | 120 |
| Polypropylene IV | 60 | 60 | 60 | 60 |
| Peroxide (50% active) | 6.60 | 3.30 | 6.60 | 9.00 |
| Coagent (50% active) | 6.60 | 6.60 | 6.60 | 9.00 |
| Processing Oil | 55 | 55 | 55 | 55 |
| Hardness (Shore A) | 67 | 70 | 73 | 74 |
| Specific Gravity | 0.966 | 1.005 | 1.007 | 1.000 |
| Ultimate Tensile Strength (MPa) | 5.86 | 6.57 | 8.12 | 6.04 |
| Ultimate Elongation (%) | 304 | 248 | 224 | 179 |
| M 100 (MPa) | 3.09 | 4.17 | 5.03 | 4.43 |
| Weight Gain (%) | 91 | 114 | 82 | 92 |
| Tension Set (%) | 9.0 | 13.5 | 11.0 | 11.0 |

The peroxide was a 2,5-di(t-butylperoxy)hexane and the coagent was triallylisocyanurate.

The analytical procedures employed to perform physical testing on each thermoplastic vulcanizate sample included the following.

The surface spot count provides a quantitative measurement of the surface spots of an extruded elastomeric strip through the use of a visual inspection standard. In performing the test, a 1 inch or 1½ inch diameter extruder equipped with a 24:1 length/diameter screw having a 3-3.5 compression ratio was used. The extruder is fitted with a strip die that is 25.4 mm wide×0.5 mm thick×7-10 mm land length. A breaker plate is used with the die, but no screen pack is placed in front of the breaker plate. In preparing the extrudate, a temperature profile is employed to give a melt temperature of 200° C.+/−3° C. A hand-held temperature probe should be used to establish the melt temperature. With the extruder having three temperature zones within the feed zone, zone 1 should be set to 180° C., zone 2 should be set to 190° C., and zone 3 should be set to 200° C. The fourth zone, which is the die zone, should be set to 205° C. These temperatures should be controlled to +/−6° C. When the zone temperatures have reached their set points, the screw should be started and about 1 kg of the sample should be loaded into the feed hopper. The extruder screw speed should be set to maintain an output of approximately 50 g+/−5 g per minute. The material should be allowed to flush through the extruder for at least five minutes before collecting any sample.

Extrusion surface roughness (ESR) was measured as described in *Chemical Surface Treatments of Natural Rubber And EPDM Thermoplastic Elastomers: Effects on Friction and Adhesions*, RUBBER CHEMISTRY AND TECHNOLOGY, Vol. 67, No. 4 (1994). The rating for each sample was determined by using a stylus profilometer.

Shore A and D hardness were determined pursuant to ASTM D-9240-91 at 23° C. by using a durometer. Ultimate tensile strength, ultimate elongation, and 100 percent modulus were determined according to ASTM D-412-92 at 23° C. by using an Instron Testing Machine. Weight gain was determined according to ASTM D-471 after 24 hours at 125° C. Tension set was determined according to ASTM D-142.

LCR capillary viscosity was determined by using a Dynisco analyzer and their recommended procedure. ΔE was determined according to SAEJ1960 (June 1989), which is the accelerated exposure of automotive exterior materials test using a controlled irradiance water-cooled xenon arc apparatus.

While the best mode and preferred embodiment of the invention have been set forth in accord with the Patent Statues, the scope of this invention is not limited thereto, but rather is defined by the attached claims. Thus, the scope of the invention includes all modifications and variations that may fall within the scope of the claims.

What is claimed is:

1. A process for producing a thermoplastic elastomer composition, said process comprising:
    synthesizing an elastomeric copolymer by polymerizing ethylene, an α-olefin, and optionally a diene monomer within the gas phase in the presence of a metallocene catalyst to thereby produce a gas-phase elastomeric copolymer;
    blending the gas-phase elastomeric copolymer with a thermoplastic polymer to form a mix of the elastomeric copolymer and thermoplastic polymer; and
    dynamically vulcanizing the gas-phase elastomeric copolymer within the mix of the elastomeric copolymer and thermoplastic polymer;
    wherein said gas-phase elastomeric copolymer has a Mooney Viscosity (ML(1+4@125° C.)) of from about 80 to about 450 and during the step of synthesizing elastomeric copolymer a carbon black dispersant is employed so that the resulting elastomeric copolymer has carbon black dispersed therein.

2. The process of claim 1, where the elastomeric copolymer includes from about 10 to about 40 parts by weight carbon black per 100 parts by weight rubber.

3. The process of claim 1, where said step of blending the elastomeric copolymer with a thermoplastic polymer further includes blending a solution-polymerized or slurry-polymerized elastomeric copolymer with the elastomeric copolymer and the thermo-plastic polymer.

4. The process of claim 3, where the gas-phase elastomeric copolymer and solution-polymerized or slurry-polymerized elastomeric copolymer form an elastomeric copolymer component that includes from about 10 to about 90 parts by weight of the gas-phase elastomeric copolymer and from about 90 to about 10 parts by weight of the solution-polymerized elastomeric copolymer.

5. The process of claim 1, where the elastomeric copolymer has a weight average molecular weight that is greater than about 200,000 and a number average molecular weight that is greater than about 80,000, and where the gas-phase elastomeric copolymer is non-oil extended.

6. The process of claim 1, where said step of blending includes blending from about 25 to about 90 percent by weight elastomeric copolymer and about 10 to about 80 percent thermoplastic polymer, based on the total weight of the elastomeric copolymer and thermoplastic polymer combined.

7. The process of claim 1, where said step of dynamically vulcanizing the gas phase elastomeric copolymer is achieved with a phenolic cure system or a peroxide cure system.

8. The process of claim 1, where the thermoplastic polymer is polypropylene.

9. A thermoplastic elastomer composition comprising: a blend of a vulcanized elastomeric copolymer and a thermoplastic polymer, where said vulcanized elastomeric copolymer derives from the vulcanization of an elastomeric copolymer that has a Mooney Viscosity (ML(1+4@125° C.)) of 80 to 450 and was synthesized by using gas phase polymerization techniques, metallocene catalysts, and a carbon black dispersant, where the vulcanized elastomeric copolymer and the thermoplastic polymer have carbon black dispersed therein.

10. The composition of claim 9, where the elastomeric copolymer includes from about 10 to about 40 parts by weight carbon black per 100 parts by weight rubber.

11. The composition of claim 9, where said step of blending the elastomeric copolymer with a thermoplastic polymer further includes blending a solution-polymerized or slurry-polymerized elastomeric copolymer with the elastomeric copolymer and the thermo-plastic polymer.

12. The composition of claim 9, where the elastomeric copolymer has a weight average molecular weight that is greater than about 200,000 and a number average molecular weight that is greater than about 80,000, and where the gas-phase elastomeric copolymer is non-oil extended.

13. The composition of claim 9, where the thermoplastic polymer is polypropylene.

14. A gas phase process for producing a thermoplastic elastomer composition, said process comprising:
    (a) polymerizing ethylene, an α-olefin, and optionally a diene monomer in the presence of a metallocene catalyst to synthesize a gas phase elastomeric copolymer in a gas phase reactor, (b) employing from 10 to about 40 parts, per 100 parts by weight elastomeric copolymer, of a carbon black dispersant in the gas phase reactor so that the resulting elastomeric copolymer:
  has carbon black dispersed throughout, and
  having a granule particle size of from about 0.4 to about 1.0mm,
(c) blending the gas-phase elastomeric copolymer with a thermoplastic polymer, and
(d) dynamically vulcanizing the gas-phase elastomeric copolymer within the mixture of the elastomeric copolymer and thermoplastic polymer, wherein said gas-phase elastomeric copolymer has a Mooney Viscosity (ML(1+4@125° C.)) of from about 80 to about 450.

* * * * *